(12) United States Patent
Makhija et al.

(10) Patent No.: US 8,347,344 B2
(45) Date of Patent: Jan. 1, 2013

(54) MEASURING REMOTE VIDEO PLAYBACK PERFORMANCE WITH EMBEDDED ENCODED PIXELS

(75) Inventors: Vikram M. Makhija, Castro Valley, CA (US); Rishi N. Bidarkar, San Jose, CA (US); Sunil Satnur, Palo Alto, CA (US); Srinivas Krishnan, Carrboro, NC (US); Banit Agrawal, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 578 days.

(21) Appl. No.: 12/337,895

(22) Filed: Dec. 18, 2008

(65) Prior Publication Data

US 2010/0162338 A1    Jun. 24, 2010

(51) Int. Cl.
    *H04N 7/173*    (2006.01)
(52) U.S. Cl. .......................... 725/116; 725/19; 725/114
(58) Field of Classification Search .................. None
    See application file for complete search history.

(56) References Cited

U.S. PATENT DOCUMENTS

| | | | |
|---|---|---|---|
| 6,381,362 B1 * | 4/2002 | Deshpande et al. | 382/162 |
| 7,593,543 B1 * | 9/2009 | Herz et al. | 382/100 |
| 7,831,661 B2 | 11/2010 | Makhija et al. | |
| 2001/0023436 A1 * | 9/2001 | Srinivasan et al. | 709/219 |
| 2004/0184526 A1 * | 9/2004 | Penttila et al. | 375/240.1 |
| 2004/0221315 A1 * | 11/2004 | Kobayashi | 725/126 |
| 2005/0187950 A1 | 8/2005 | Parker | |
| 2006/0206491 A1 * | 9/2006 | Sakamoto et al. | 707/10 |
| 2007/0125862 A1 * | 6/2007 | Uchiyama et al. | 235/462.09 |
| 2009/0100164 A1 * | 4/2009 | Skvortsov et al. | 709/223 |
| 2009/0259941 A1 * | 10/2009 | Kennedy, Jr. | 715/719 |
| 2011/0047211 A1 | 2/2011 | Makhija | |

OTHER PUBLICATIONS

Lawrence Andrew Spracklen, U.S. Appl. No. 12/942,393 entitled, "Monitoring Audio Fidelity and Audio-Video Synchronization", filed Nov. 9, 2010.
Lawrence Andrew Spracklen et al., U.S. Appl. No. 13/079,972 entitled, "Quality Evaluation of Multimedia Delivery in Cloud Environments", filed Apr. 5, 2011.
Bhavesh Mehta, U.S. Appl. No. 13/212,054 entitled, "Measurement of Streaming-Audio Quality", filed Aug. 17, 2011.

* cited by examiner

*Primary Examiner* — Brian Pendleton
*Assistant Examiner* — Cai Chen

(57) ABSTRACT

Methods, systems, and computer programs for measuring performance of remote video delivery are presented. The method embeds at a server computer a marker in selected frames of a video stream. The marker includes a preconfigured sequence of pixels and is followed by a frame number encoded in the pixel data. The method then finds a first marker at a client computer to determine the location of the markers in a display. Once the location of the markers is determined, markers in following frames are detected with their corresponding frame numbers. The method stores the arrival times and frame numbers for each detected marker. The stored arrival times and frame numbers can be used for statistical performance analysis of remote video delivery.

37 Claims, 11 Drawing Sheets

MEASURING REMOTE VIDEO PLAYBACK PERFORMANCE WITH EMBEDDED ENCODED PIXELS

CROSS REFERENCE TO RELATED APPLICATIONS

This application is related to U.S. Pat. No. 7,831,661, granted on Nov. 9, 2010, and entitled, "Measuring Client Interactive Performance Using a Display Channel," the application for which is incorporated herein by reference.

BACKGROUND

The computing industry has seen many advances in recent years, and such advances have produced a multitude of products and services. Computing systems have also seen many changes, including their virtualization. Virtualization of computer resources generally involves the abstraction of computer hardware, which essentially isolates operating systems and applications from underlying hardware. Hardware is therefore shared among multiple operating systems and applications each isolated in corresponding virtual machines (VMs). The result of virtualization is that hardware is more efficiently utilized and leveraged, and Virtual Desktop Infrastructure (VDI) is becoming a more promising solution. With VDI, users access over a network connection personal desktops provided by virtual machines running on remote servers. Each VM is a complete execution environment, and the server provides a user interface over the network connection so that user inputs and outputs are communicated between the user and the VM. It is desirable to provide a desktop experience to the end-user when using remote services similar to the experience users have when using a traditional system where programs execute locally. The quality of the user experience can vary based on many underlying factors such as round-trip latency or network bandwidth.

Among many critical applications for remote delivery, remote video playback has been identified by solution providers as one of the most important applications. Remote video playback is also one of the most commonly used applications while being susceptible to performance degradation due to stress placed in the underlying resources required for live video delivery, such as server computing power and downlink bandwidth. During video delivery, a multitude of resources can become a bottleneck. While there are some measures to find the utilization of some of these resources, there is not an accurate way of measuring the video performance and quality on the remote side. Past approaches have used the analysis of incoming network data in an attempt to correlate network performance and video quality. This approach is not accurate as it might happen that the protocol on the server side reduces the bit rate of the video due to limited bandwidth or because there may be some packets for player skins, window appearance, or other screen updates, that affect video performance.

It is in this context that embodiments of the invention arise.

SUMMARY

Embodiments of the present invention provide methods, systems, and computer programs for measuring performance of remote video delivery. Encoded information is added to pixels in video frames to identify frame numbers and obtain information on the delivery of video to a remote client.

It should be appreciated that the present invention can be implemented in numerous ways, such as a process, an apparatus, a system, a device or a method on a computer readable medium. Several inventive embodiments of the present invention are described below.

In one embodiment, a method embeds at a server computer a marker in frames of a video stream. The marker includes a preconfigured sequence of pixels and is followed by a frame number encoded in the pixel data. In one embodiment, one bit is encoded per byte of pixel data. The method then finds a first marker at a client computer to determine the location of the markers in a display. Once the location of the markers is determined, markers in following frames are detected with their corresponding frame numbers. The method stores the arrival times and frame numbers for each detected marker. The stored arrival times and frame numbers can be used for statistical performance analysis of remote video delivery. In another embodiment, a computer program embedded in a computer-readable storage medium is used to perform the method.

In yet another embodiment, a system for measuring performance of remote video delivery includes a video server, a video client, and a performance server. The video server delivers a video stream and embeds a marker in selected frames of the video stream. The marker holds a preconfigured sequence of pixels and is followed by pixels holding an encoded frame number. The video client receives the video stream and is configured to find a first marker and then detect following markers in other video frames. Once the first marker is found in a display, its location is used as the location for finding other markers, with their corresponding frame numbers. The performance server is configured to receive from the video client an arrival time and frame number for each detected marker, and to store the received arrival times and frame numbers.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe a method and apparatus for measuring performance of remote video delivery. It will be obvious, however, to one skilled in the art, that the present invention may be practiced without some or all of these specific details. In other instances, well known process operations have not been described in detail in order not to unnecessarily obscure the present invention.

Figure 1:
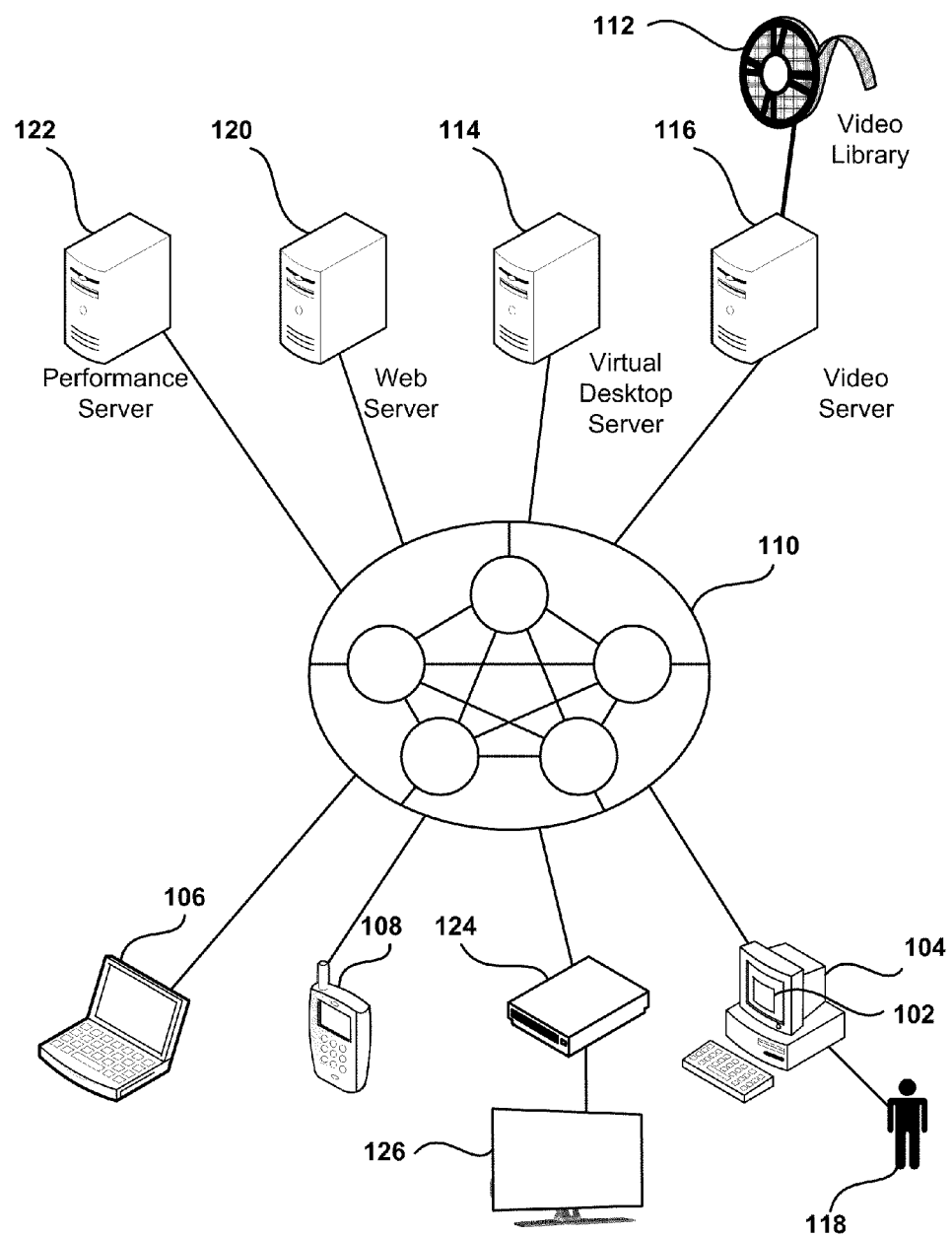
FIG. 1 depicts a remote video playback environment, according to one embodiment.

FIG. 1 depicts a remote video playback environment, according to one embodiment. The environment depicted in FIG. 1 includes virtual desktop server 114 that provides a virtual desktop to remote user 118. Although embodiments of the present invention are described within a virtual desktop system, the embodiments presented can be used in other environments with a remote display application transmitting display data to a remote client.

Video server 116 has access to video library 112 that holds a variety of different videos for presentation to user 118. Video server 116 can deliver videos directly to user 118, or can deliver videos to virtual desktop server 114, which in turn delivers videos to user 118. In one embodiment, the video is delivered inside browser window 102 by web server 120.

Performance server 122 collects performance data from servers and clients and analyzes the data collected for presentation to a user. While the different servers are shown separately in FIG. 1, servers 114, 116, 120, and 122 can be combined in one or more servers, or be replicated across a multitude of servers for video delivery optimization. Network 110 transfers data among servers and between servers and clients. Clients for video delivery can be of many types, such as personal computer 104, laptop 106, mobile phone 108, PDA, TV screen 126 connected to set top box 124, etc.

Embodiments of the invention measure the performance of the virtual environment as seen by user 118, or by a plurality of users. The video data is encoded before being transmitted over network 110. The video data can be transmitted using different video encoding methods and protocols, such as Remote Desktop Protocol (RDP) for computers running Microsoft Terminal Services, multimedia streaming technologies such as Adobe's Flash®, Microsoft's Silverlight™, and Digital Multimedia Broadcasting (DMB), digital TV signal transmission protocols, such as Digital Video Broadcasting (DVB), Digital Terrestrial Television (DTT), etc.

Remote Desktop Protocol is a multichannel capable protocol that supports separate virtual channels for carrying presentation data, serial device communication, licensing information, highly encrypted data (keyboard, mouse activity), etc. In one embodiment the video data is transmitted using RDP's display channel. In many cases, the display channel is the only channel that reaches the client machines because of firewalls and other obstacles between servers and clients. Additionally, the embodiments presented are independent of the communications protocols used to transfer display data, thus being able to reliably obtain performance measurements under different topologies and protocols and assess how different factors affect video performance. Further still, the methods presented can scale to tens of thousands of clients and servers without unduly burdening the virtual infrastructure.

Network packet analysis is not enough to obtain a reliable performance measurement of video delivery. One approach for obtaining performance metrics is to use a separate socket connection to communicate video meta-data to the client, such as the frame number of each frame transmitted. The problem with this approach is that since video frames are sent on a separate connection, the packets can arrive in different order and the latency measurement is not accurate. This approach also requires modifications on the server side. Therefore, an approach is needed which is not dependent on any underlying protocol, does not require any changes on the server side, and provides an accurate way of measuring the latency and quality of remote video playback on the client side.

Embodiments of the present invention provide for encoding video meta-data in the video data, also referred to herein as water-marking, in each frame of the video such that the meta-data can accurately be identified on the client side.

Figure 2:
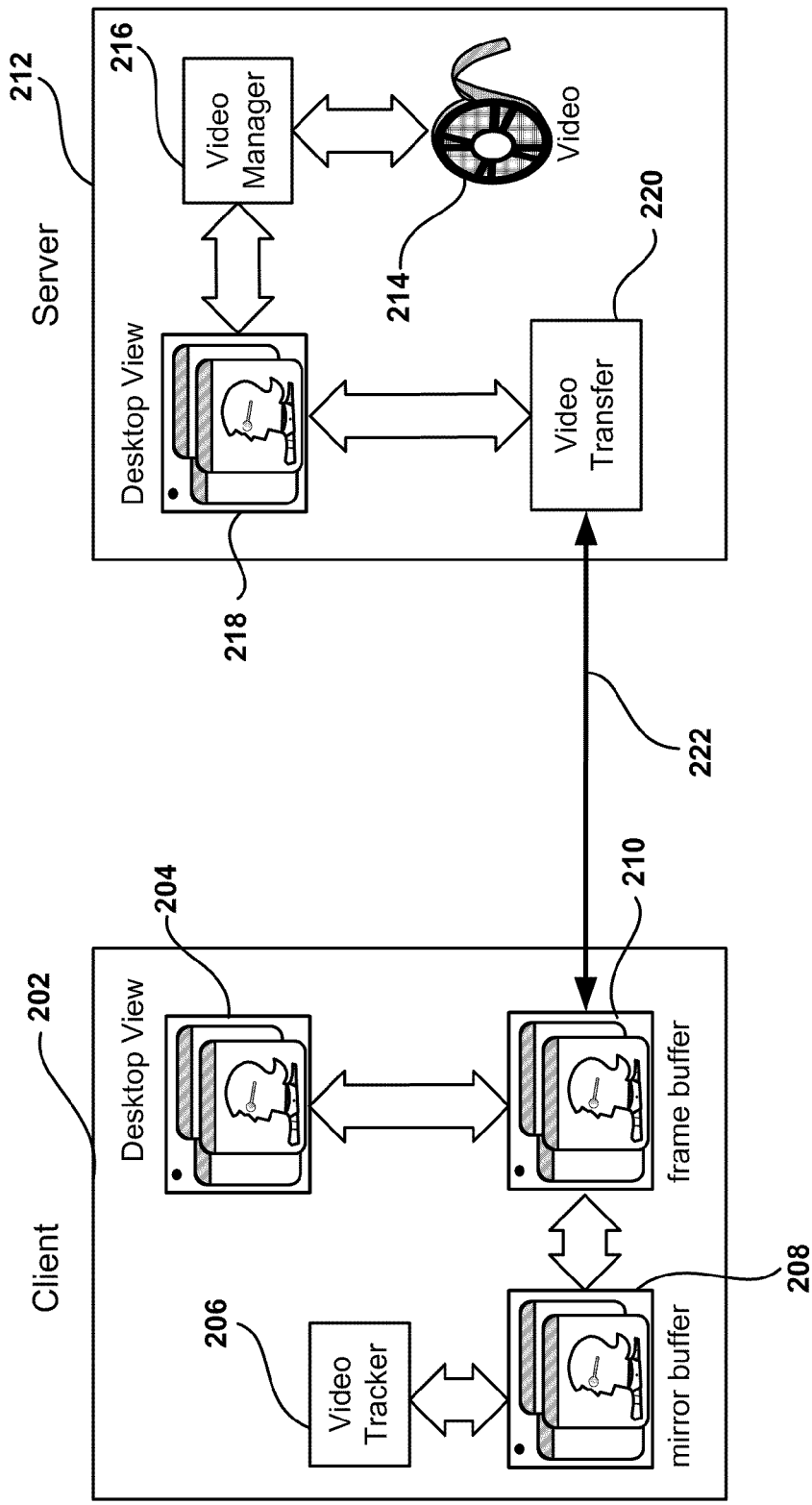
FIG. 2 shows an architecture for measuring video performance using information sent on the video channel and detected on a mirror buffer, in accordance with one embodiment.
Figure 6:
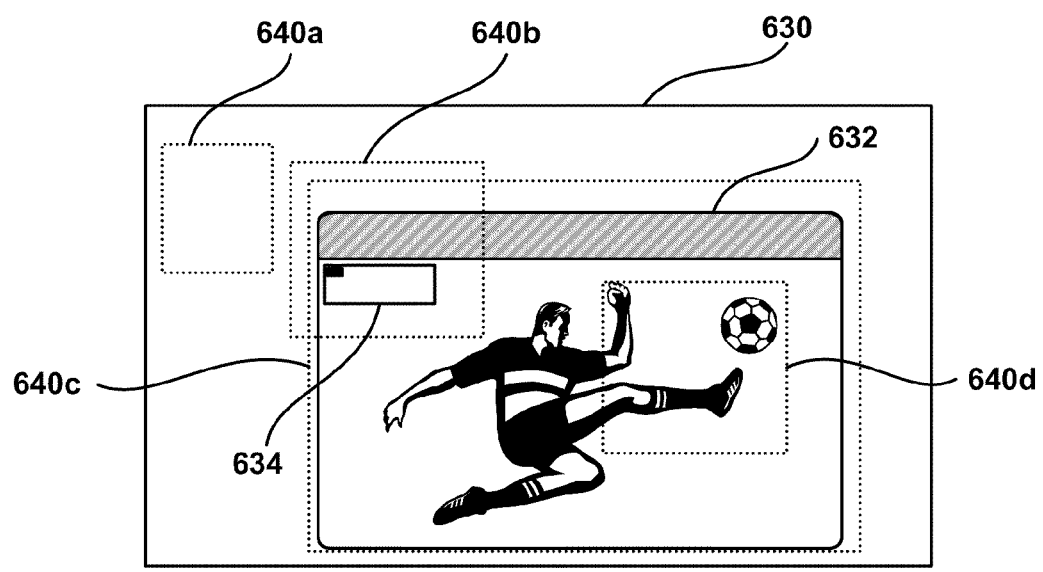
FIG. 6 illustrates an embodiment for communicating video information via incremental updates.

FIG. 2 shows an architecture for measuring video performance using information sent on the video channel and detected on a mirror buffer, in accordance with one embodiment. Video server 212 generates a virtual desktop view 218 of a video display which is transferred to client 202. Video manager 216 access video library 214 to obtain the required video information and plays the video for remote client 202. Video transfer module 220 communicates with remote client 202 to transfer the video data over communication channel 222. In one embodiment, the video data is sent in the form of video updates, as seen in FIG. 6, but other methods for transferring video data are possible.

At client 202, frame buffer 210 drives a video display (not shown) using a memory buffer containing a complete frame of data for client's desktop view 204. The information in the buffer typically consists of color values for every pixel on the screen. Color values are commonly stored in 1-bit monochrome, 4-bit palettized, 8-bit palettized, 16-bit highcolor and 24-bit truecolor formats.

To accurately measure quality and latency of remote video playback, knowing which frames are received on the client side and at what time is critical. This is difficult to do in the network layer as the packets do not necessarily have information on video frames. Embodiments of the present invention use information on the display driver where all the updates are being rendered since all the video frames are being rendered to display device frame buffer 210. Server 212 generates customized videos with encoded embedded information. In one embodiment, the encoding includes a marker and video meta-data. The marker can be a known sequence of video pixels, also referred to herein as magic pixels, and the video meta-data provides information on the video frame, such as frame number. One embodiment for encoding video meta-data is described below with reference to FIG. 5. Other information that can be included in the video meta-data may include a timestamp, identification of the application generating the video image, server identification (e.g. name, IP address, etc.), video information (screen size, resolution, encoding, etc.), compression information, proxy server information, web server, etc.

In one embodiment, the marker and the meta-data are included in each frame, and in other embodiment, the marker and meta-data are included periodically, such as for example one out of every 2 frames. The frequency for embedding frame information can be adjusted over time, such as for example a higher frequency at the beginning of video delivery, and a lower frequency after a predefined initial period. Additionally, the frequency can be adjusted depending on environmental factors, such as the application running the video, the video resolution, the network bandwidth of the client or server, etc. Although sampling frames does not produce a performance metric as accurate as when examining every frame, the performance measurements with sampling can be almost as accurate if the number of frames examined is large. For example, if only frames with even frame numbers are added markers, after examining a large number of even frames, such as 1,000 frames, and the method calculates that five percent of even frames are lost during video transmission, then it is reasonable to extrapolate this metric and assume that the overall drop rate (for both even and odd number frames) is five percent. Sampling results in computing resource savings by decreasing the amount of processing required for the transmitted video frames.

As video frames come in, the video data is examined and if the encoded information is found, then the frame number and arrival time is recorded for the video frames. This approach works well for lossless compression where there are no changes in the value of markers and frame number pixels. However, the approach does not work correctly in case of lossy compression as the markers and meta-data can change during transmission due to compression and decompression. In one embodiment, value ranges around expected pixel values are used in order to compensate for transmission losses, as described below with respect to FIG. 7.

Mirror buffer 208 holds a copy in memory of frame buffer 210 to lower the amount of processing required by video tracker 206 to scan for encoded pixels. Display mirroring technology is widely employed by remote desktop applications such as: NetMeeting, PC Anywhere, VNC, Webex, etc. Mirroring performs better than primitive screen grabbing, because mirroring allows the capture of only the minimally updated regions of the display and retrieves data directly, bypassing the intermediate copy. One example of a mirror buffer commercially available is DFMirage, a video driver mirroring technology for the Windows NT OS family. DFMirage is a driver for a virtual video device managed at the DDML level of the graphics system that exactly mirrors the drawing operations of one or more physical display devices. In another embodiment, video tracker 206 inspects frame buffer 210 directly without using a mirror buffer.

Video delivery may include MultiMedia Redirection (MMR), where software modules at the client and the server work intelligently to redirect multimedia processing tasks dynamically between the client and server. The multimedia stream is decoded locally on the client using the local processing power of the device thereby providing complete multimedia playback capabilities overcoming any limitations that are inherent in traditional thin computing architectures. The multimedia stream is decoded on the client thereby freeing up the processing power on the server. In one embodiment where MMR is used, the video tracker analyzes the video data once the MMR component at the client decodes the video data. The method can also be used if Adobe Flash® redirection is used, by analyzing video frame information after the video information is decoded at the client.

In another embodiment, video performance measurements are taken under different server or client loads to analyze how the availability of computer resources (such as CPU, memory, etc.) affects video delivery. For example, video performance measurements are made for a server running a web hosting application, and for the same server when web hosting is not operational. The results are compared to analyze how web hosting impacts the delivery of video from the same server.

Figure 3A:
FIGS. 3A-D describe different embodiments for sending encoded information on the video channel.

FIGS. 3A-D describe different embodiments for sending encoded information on the video channel. In FIG. 3A, encoded block 302, also referred to herein as a macro-block, including marker and meta-data is embedded in the top left corner of the video image, but other locations on the video screen are also possible. See below FIG. 5 for more details on encoding the information into the video data. FIG. 3A shows a windows display environment where the video image is presented in one of the windows. In other environment such as the one shown in FIG. 3B, the video is display in full-screen mode. The delivery of full-screen video may include a resolution change at the client of the video transmitted in order to fill the complete video screen. In this case, one embodiment includes examining the video frames received before expanding the video at the server for full-screen presentation. In one embodiment, the scale of expansion is predefined, and in another embodiment the scale of expansion is communicated to the client as embedded information in the frames.

Figure 3B:
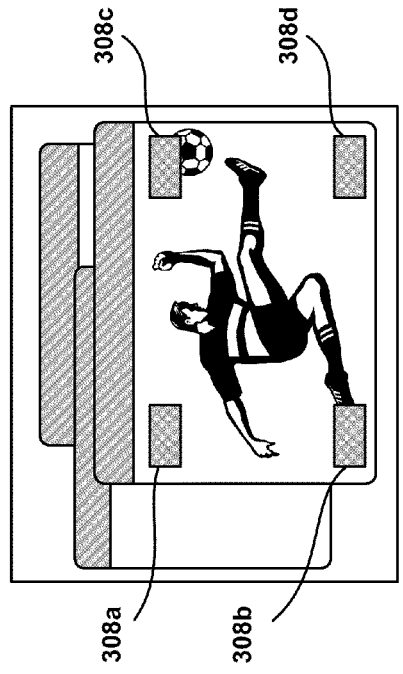

In the embodiment shown in FIG. 3B, encoded block 304 is masked with a known value on the screen, such as icon 310, that is, the area corresponding to encoded block 304 is replaced with other video information at the client in order to hide the encoded block to the user. The icon may be preconfigured at the client, or may be transmitted as meta-data in encoded blocks. In another embodiment where encoded blocks are not transmitted in every frame, encoded block 304 is masked with video data from the most recent video frame received without an encoded marker.

Figure 3C:
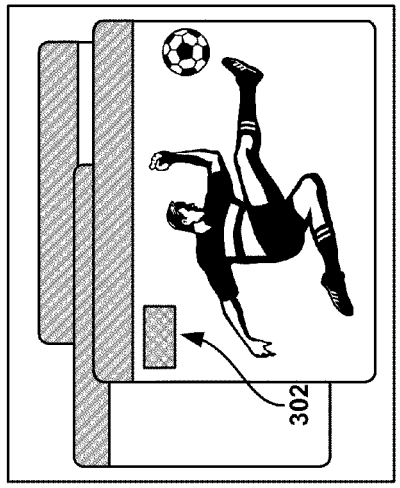

FIG. 3C shows encoded block 306 inside video being displayed inside a browser window. Because the location of the window can change as well as the location of the video area within the browser, it is necessary to find where the encoded block is within the display. See below FIG. 6 for methods to find the encoded block.

Figure 3D:
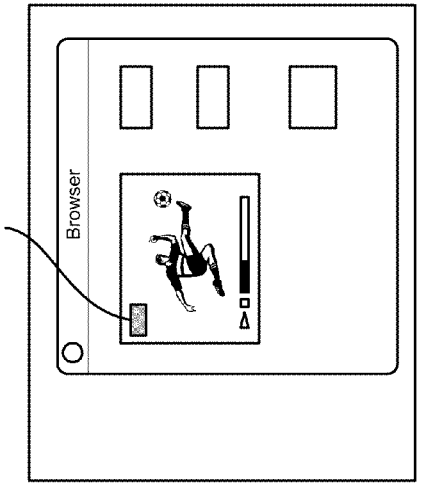

FIG. 3D shows an embodiment where redundant information is sent within the video data. Encoded blocks 308a-d are included in different parts of the video display for redundancy, which can be useful in cases with high loss of video information, or to assist visual block recognition during testing.

It should be appreciated that the embodiments illustrated in FIGS. 3A-D are exemplary arrangements of encoded blocks within a video frame. Other embodiments may utilize different arrangements or different pixel values. The embodiments illustrated in FIGS. 3A-D should therefore not be interpreted to be exclusive or limiting, but rather exemplary or illustrative.

Figure 4:
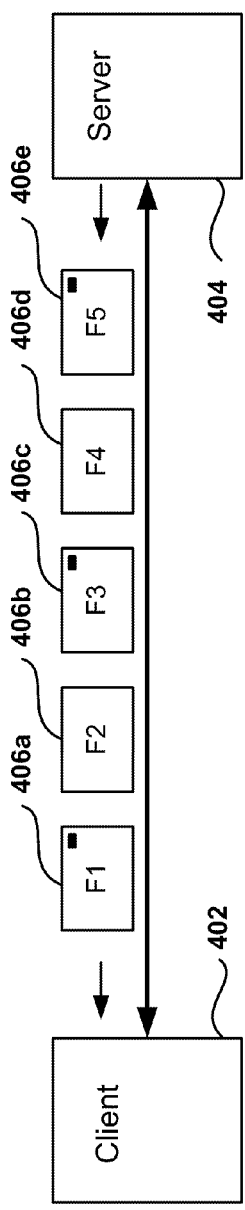
FIG. 4 depicts video communication between a client and a server in accordance with one embodiment.

FIG. 4 depicts video communication between a client and a server in accordance with one embodiment. Server 404 transmits frames F1-F5 406a-e in sequence to client 402. A complete video frame can be sent in one operation, or the video frame can be sent fractionally in subsections of the video display known as updates. In addition, the video frames or the video updates can be segmented by the corresponding underlying transport layers in order to send the data over a network. In one embodiment, only selected frames include embedded information, such as frames 406a, 406c, and 406e. In another embodiment, all frames carry embedded information.

Figure 5:
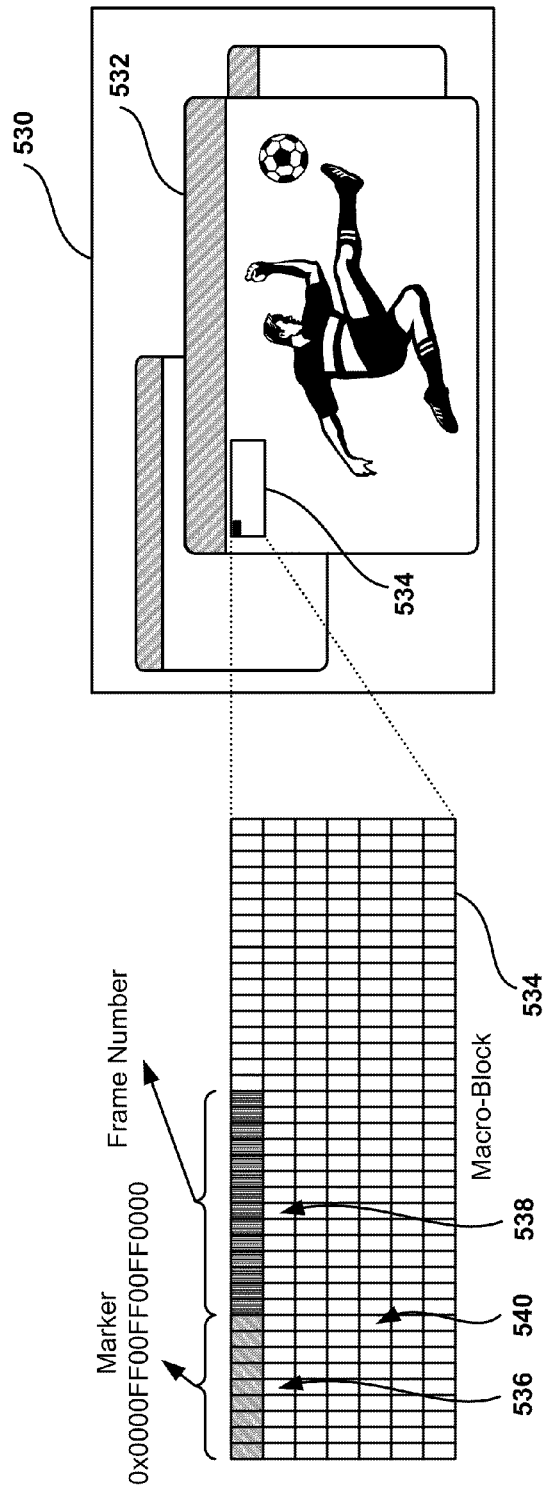
FIG. 5 illustrates an embodiment for transmitting encoded information in the pixels of a video communication.

FIG. 5 illustrates an embodiment for transmitting encoded information in the pixels of a video communication. Encoded macro-block 534 is embedded inside window 532 of display 530. Macro block 534 includes marker 536, meta-data 538, and filler 540. In one embodiment, macro block 538 has a size of 100 pixels, but other values are also possible. It should be appreciated that macro block 534 in FIG. 5 is an exemplary arrangement and other embodiments may utilize different components, a subset of the components, or the same components in different order. The embodiment illustrated in FIG.

5 should therefore not be interpreted to be exclusive or limiting, but rather exemplary or illustrative.

Pixels inside macro block 534 can have one of three values according to one embodiment:
1. Red <0xff0000>,
2. Green <0x00ff00>, or
3. Blue <0x0000ff>.

These three particular colors have bytes components that are either 0xff or 0x00. Even if there is a lossy compression in a particular protocol, the final color value after decompression would not change drastically since the protocol has to provide a similar-look screen on the client side. For example, if byte 0x00 changes to 0x3a after decompression, using an appropriate deviation threshold can be used to mask this undesired noise. In one embodiment, the deviations from the expected values are recorded as an additional measure of the quality of the video received.

Video meta-data 538 is encoded in similar fashion. In one embodiment, a frame number is encoded using bytes 0xff or 0x00. Each bit of the frame number is encoded in one byte. For example, if the maximum frame number can be represented in n bits, then the bit wise representation of the frame number is noted as $\{b_0 b_1 \ldots b_n\}$. If bit $b_i$ has a binary value of 1, then $b_i$ is encoded as 0xff and if it has a binary value of 0, then $b_i$ is encoded as 0x00. Thus, each frame number is encoded as a sequence of 0xff and 0x00. This encoding is useful when reconstructing the frame numbers on the client side since the appropriate thresholds are used to mask noise that was generated in lossy compression, or noise due to any other reason. In other embodiment, each bit is encoded in a plurality of bytes from the pixel data. In yet another embodiment, each bit of information is encoded in one sub-pixel of the pixel data. The sub-pixel is represented as an intensity value for a color component of one pixel. Typically, the sub-pixel defines intensity information for a red, green, or blue component of the pixel. For 24-bit "Truecolor" where each sub-pixel is encoded as one byte (8 bits) of pixel data, then each bit is encoded in one byte, but if the sub-pixel requires a different amount of storage, then each bit would be encode using the amount of storage required for the sub-pixel. For example, in 16-bit "Highcolor," the red and blue sub-pixels may be encoded with 5 bits of data each, whereas the green sub-pixel is encoded with 6 bits.

Some video and image compression algorithms rely on a technique known as chroma subsampling, wherein chroma, or color information, is sampled at a lower resolution than the luma, or brightness information. In this case, using sub-pixel information might be unreliable for individual pixel data. Where chroma subsampling is used, each bit of information may be encoded using an overall intensity of the pixel, rather than discriminating on the basis of sub-pixel information. In this case, white and black pixels may be used so that each pixel correlates to one bit of information. Various techniques can be implemented to obtain an accurate overall intensity value. For example, since the green color component carries most intensity information, the green color component for each pixel can be used alone to identify the bit value.

In one embodiment, the video frames are decoded first in separate image files and then the magic pixels and particular frame numbers are embedded in each image in the first eight pixels (24 bytes assuming BGR24 encoding). It might happen that some protocols will perform video optimization and discard very small changes, to only send significant updates to the video frame with respect to the previous video frame. Hence, to avoid losing information due to video optimization, random filler 540 is included in macro block 534, where random filler 540 is different from frame to frame. By customizing the video, each frame is sent with the random filler, the marker, and the frame number. Finally, the image files are encoded using lossless compression to make the customized video with embedded meta-data.

In another embodiment, the encoding of video frames is done "on the fly," that is, the encoding of the video frame is done on the video data as the video data is being processed before being transmitted to the client. In yet another embodiment, the encoding of the video frames can be done "on the fly" and upon request by an operator. This allows the operator to turn on and off the encoding in order to obtain video quality measurements on a particular client at will. This can be useful to check if video delivery supports a desired service level that meets a required Service Level Agreement (SLA).

Note that the above encoding is exemplary and many modifications thereto, would occur to a person of ordinary skill in the art having benefit of this disclosure, and is well within the scope of the invention. For example, the previously described process can be used in video data with different color depth and different number of encoded bits per pixel.

FIG. 6 illustrates an embodiment for communicating video information via incremental updates. Different remote display protocols send updates in different ways. A video frame can be sent as multiple updates, which may be done for optimization purposes by different communication protocols. Updates 640*a-d* correspond to different sections of the video display. If the video is running in window 632, the location of macro block 634 can vary depending on the location of the window, and in some cases of the location of the video within the window (as seen in FIG. 3C).

It would be very resource intensive to search for the markers in each video frame at the client. In one embodiment, the location of the marker is found on a first frame, and then only that location of the marker is examined in future frames to search for the macro block. To simplify the search on the client, only a pre-specified video screen area is searched for the marker in one embodiment, but the complete screen 630 can also be used as the scope for the marker search. If the update rectangle does not overlap with the pre-specified video screen, then the update rectangle is considered not to have a marker embedded. Conversely, if the update does overlap the pre-specified video screen area, then the intersection of the update and the pre-specified video screen area is scanned for a marker or a macro block.

In one embodiment, the following conditions must be met to determine that a marker has been found:

1. The first nine consecutive bytes follow these constraints:

$b_2$, $b_4$, and $b_6$>upperThreshold $b_0$, $b_1$, $b_3$, $b_5$, $b_7$, and $b_8$<lowerThreshold 2. All following 15 bytes $b_i$ ($i \in $ 0-14) follow this constraint:

($b_i$<lowerThreshold) or ($b_i$>upperThreshold)

These conditions imply a marker with a value of 00000FF00FF00FF0000, but other markers are possible by adjusting the first condition. If all the constraints are satisfied for a particular pixel, then the pixel is considered the start of the marker, and the position of the pixel is recorded to define the area where markers will be searched for all incoming video frames or updates. The values of upperThreshold and lowerThreshold can be adjusted to control the number of false positives. In one embodiment their values are 0xa0 and 0x50 respectively, but other values are also possible. The following pseudo-code describes the algorithm used to find the marker:

```
FindMagicPixelsStartPoint( )
    If (update_rectangle_overlap(video_screen) == false)
        return None
    Region = intersection(video_screen, update_rectangle)
    For each pixel in Region
        Skip_pixels_if_constraints_not_met( )
        If (CheckForRGBConstraints(pixel)  == True)
        If (CheckforFrameNumberConstraints(pixel) == True)
            return pixel
```

Once the marker has been identified, the frame number is found by scanning the following 15 bytes. If a given byte is bigger than 0x80, then the given byte is assigned a binary value of 1, and otherwise it is assigned a binary value of 0. The 15 bits are combined together to form the final frame number. The following pseudo-code describes the process of finding the frame number:

```
FindCurrentFrame( )
    startPixel = MagicPixelStartPoint
    framePixelStartPoint = startPixel + 9
    frame_num = 0
    for  i  in  [0 to 14]
        index = framePixelStartPoint + i
        bit  =  (framebuffer[index]  > 0x80)
        frame_num = ( bit << i )  |  frame_num
    return frame_num
```

Figure 7:
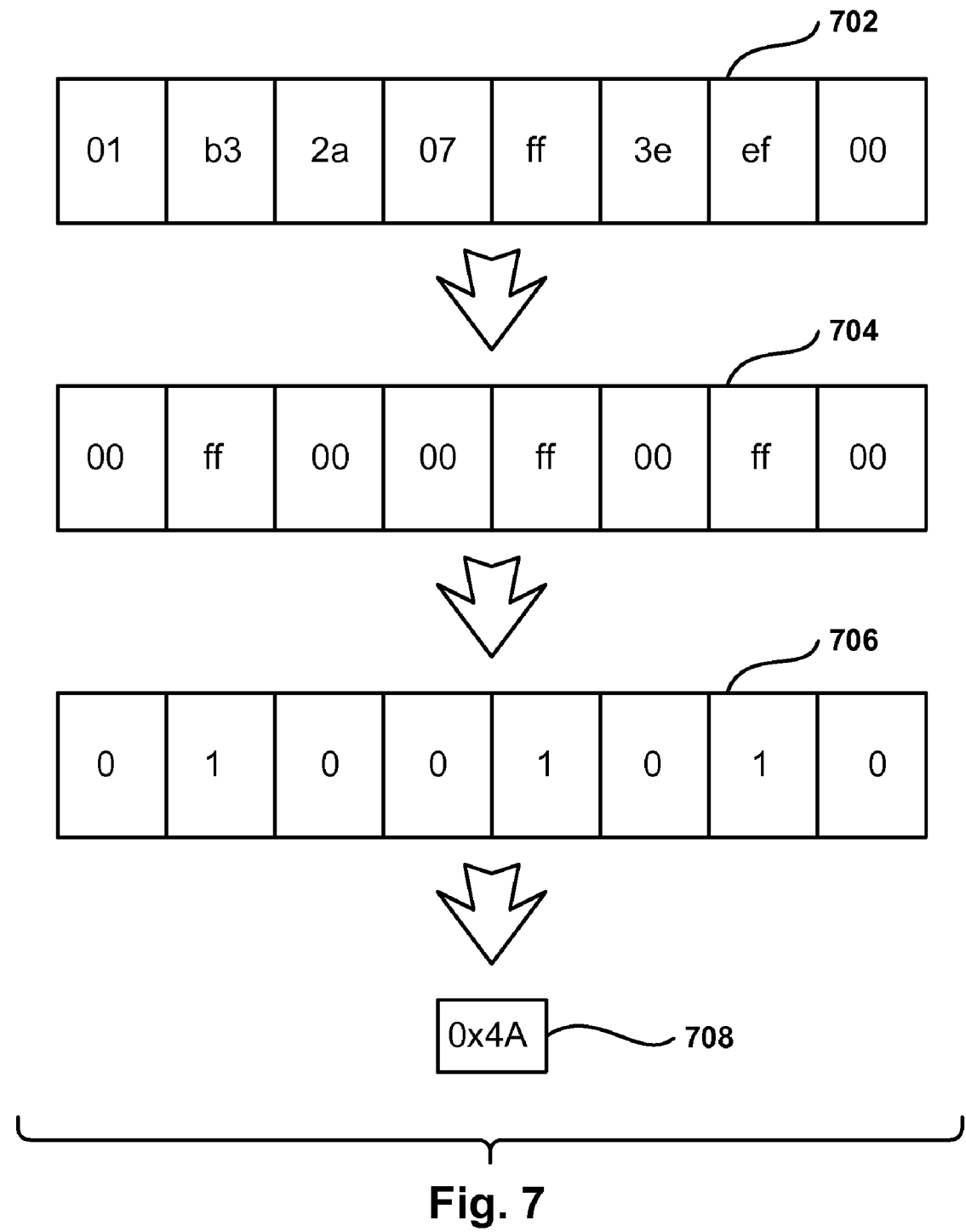
FIG. 7 describes the decoding of one bit of information per byte of pixel data, according to one embodiment.

The use of 15 bits for the frame number is exemplary, and other values can also be used. Other embodiments used other types of encoding for the frame number based on color depth and resolution. FIG. 7 describes the decoding of one bit of information per byte of pixel data, according to one embodiment. The frame number of FIG. 7 has a size of eight bits. Eight bytes are included in the sample received sequence 702. In the first operation, each byte is assigned a predicted transmitted value, as previously described. For example, 0x01 is attributed an expected transmitted value of 0x00, and 0xb3 is attributed a 0xff. Further, each attributed value is assigned a bit value of 0 or 1, as seen in string 706, and the 8 bits are combined into one frame number 708 with a binary value of 0x4A.

Figure 8:
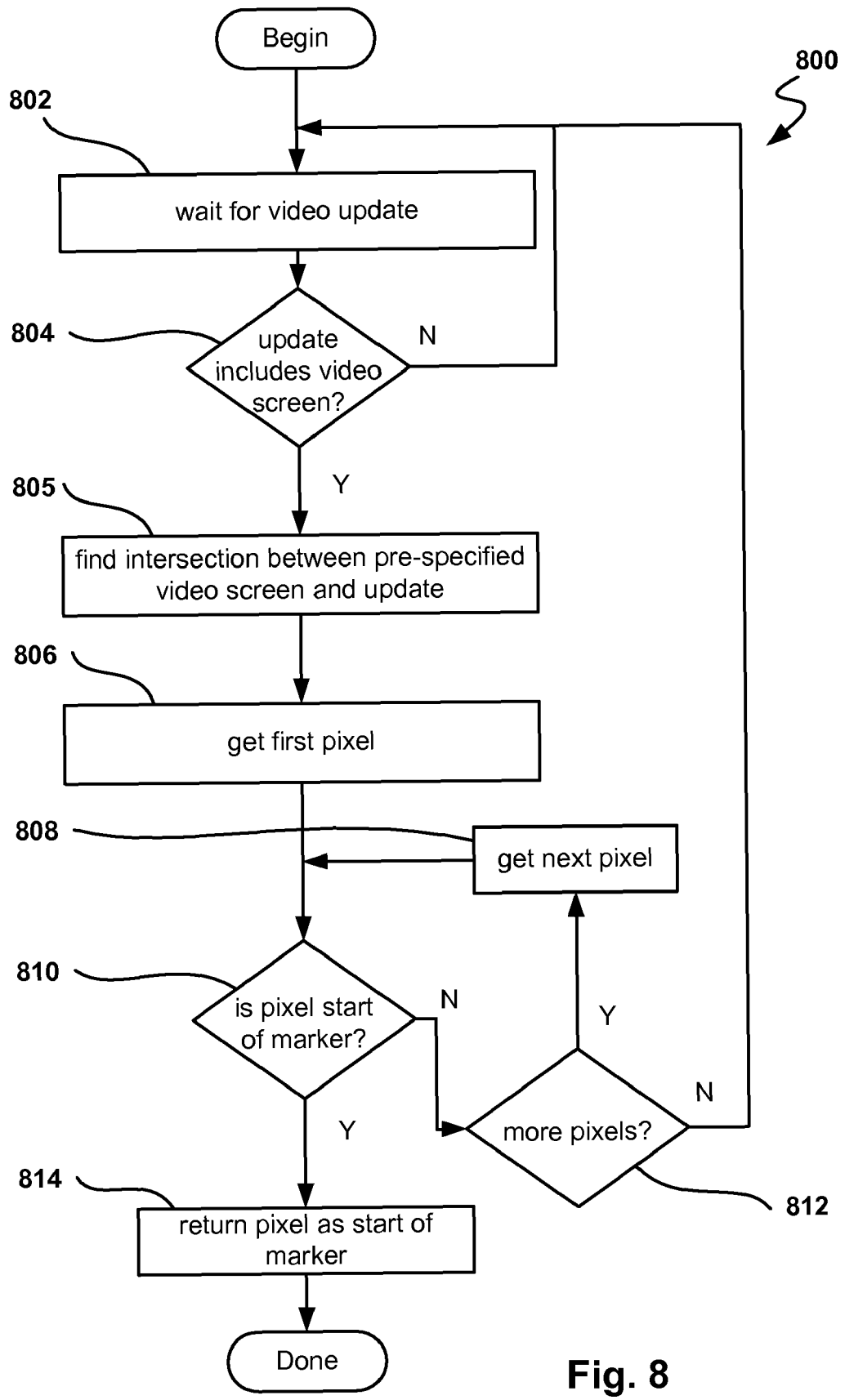
FIG. 8 shows the process flow for detecting the beginning of a marker in the video communication, according to one embodiment.

FIG. 8 shows the process flow for detecting the beginning of a marker in the video communication, according to one embodiment. In operation 802, the process waits for a video update. Once the video update is received, operation 804 determines whether the video update includes at least a part of the video screen where markers can be detected. If the update does not include a possible location for a marker the method returns to operation 802, otherwise the method continues to operation 805 where the intersection between the pre-specified video screen and the update is found. In operation 806, a first pixel is obtained from the intersection area as the first candidate for a possible beginning of the marker.

Operation 810 determines whether the pixel satisfies the conditions for being the beginning of the marker. See for example the conditions described above with respect to FIG. 6. If the beginning of the marker has been detected, the method continues to operation 814 that returns the pixel as the start of the marker, otherwise the method continues to operation 812 to check if there are more candidate pixels. If there are more candidate pixels, the method flows to operation 808 where the next pixel is selected before cycling back to operation 810. If operation 812 determines that there are no more candidate pixels, the method returns to operation 802 where the method waits for a new video update.

Figure 9A:
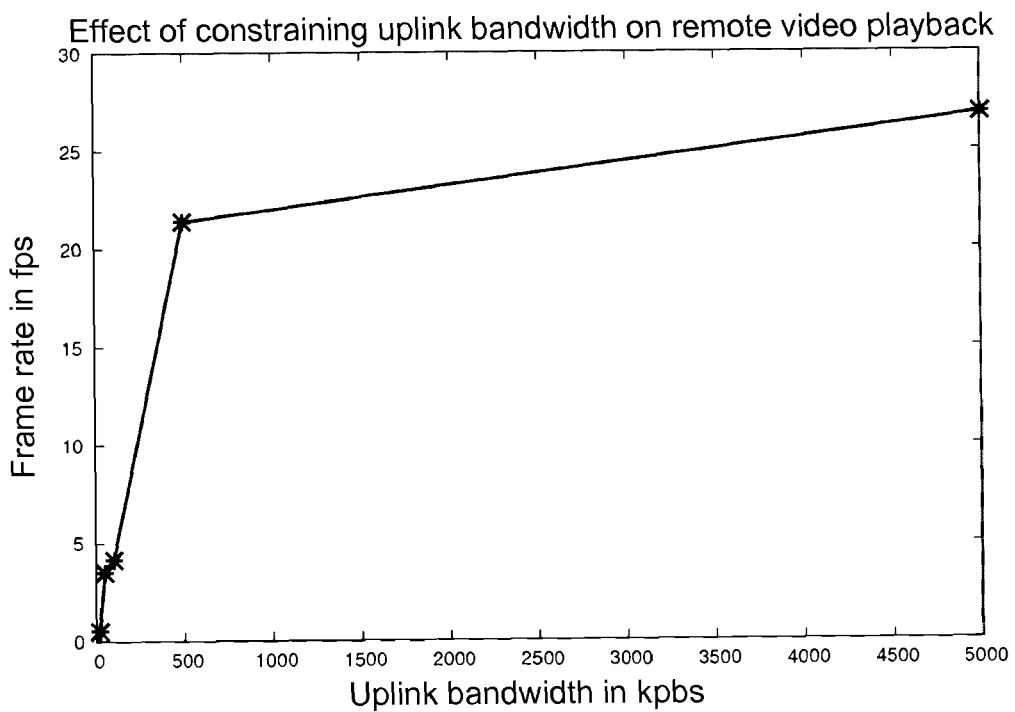
FIGS. 9A-C show graphical representations of performance metrics obtained with embodiments of the present invention.
Figure 9B:
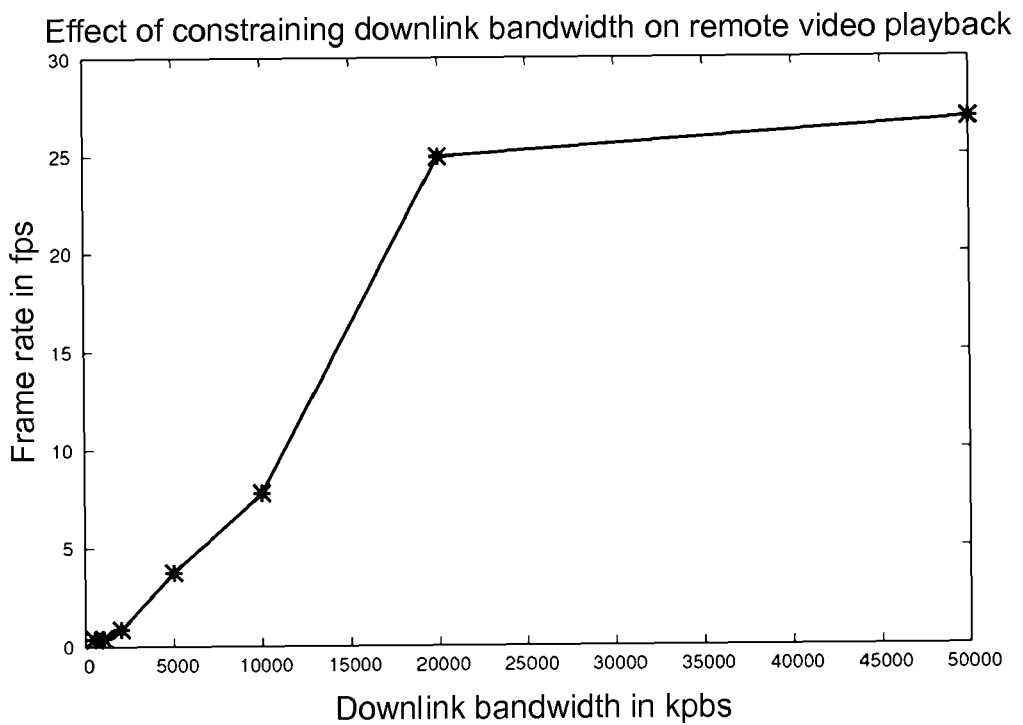
Figure 9C:
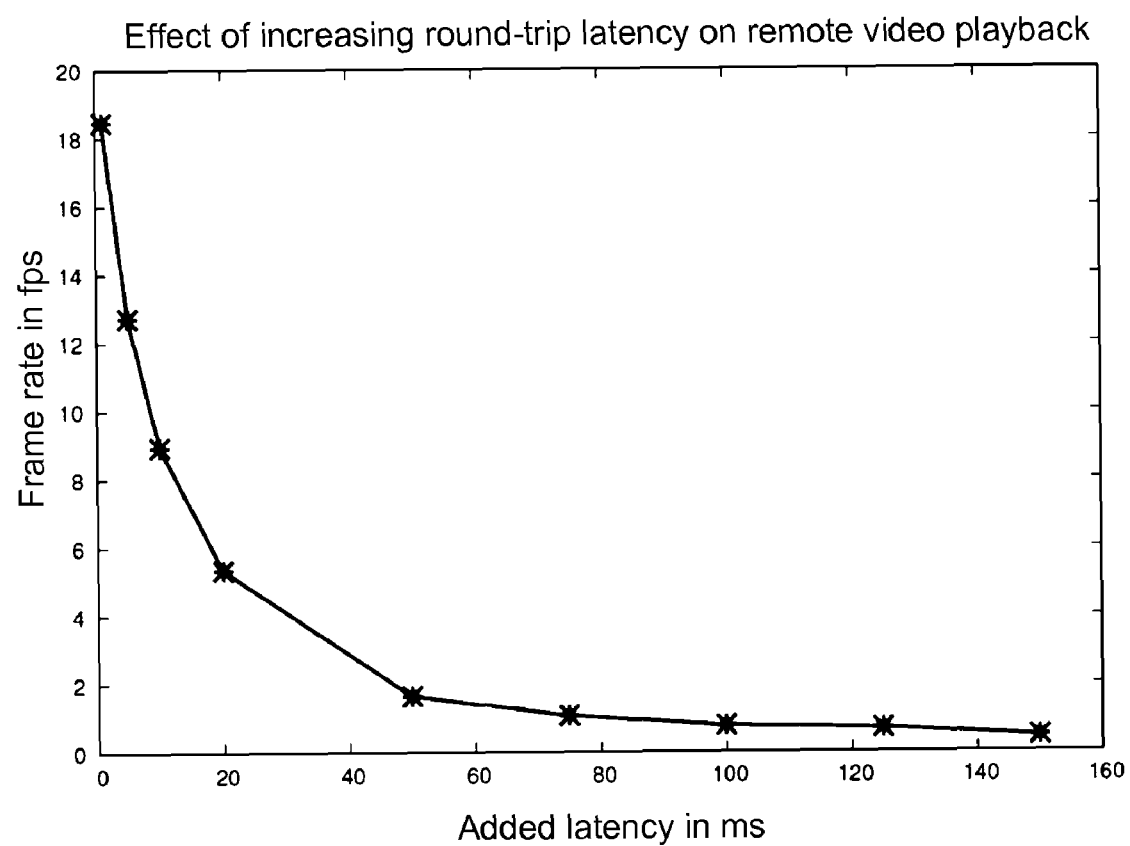

FIGS. 9A-C show graphical representations of performance metrics obtained with embodiments of the present invention. FIG. 9A shows the effect of constraining uplink bandwidth on remote video playback according to one embodiment. The supported frame rate experiences a drastic drop once the uplink bandwidth goes below 100 kilobit per second (kpbs). FIG. 9B shows the effect of constraining downlink bandwidth on remote video playback. For downlink speeds above 20,000 kpbs the supported frame rate is almost constant. For downlink speeds below 20,000 kpbs the supported frame rates go down in an approximate linear fashion.

FIG. 9C shows the effect of increasing round-trip latency on remote video playback. As the round-trip latency increases, the frame rate supported goes down because frames get dropped due to the network conditions or due to high resource usage on the server.

Figure 10:
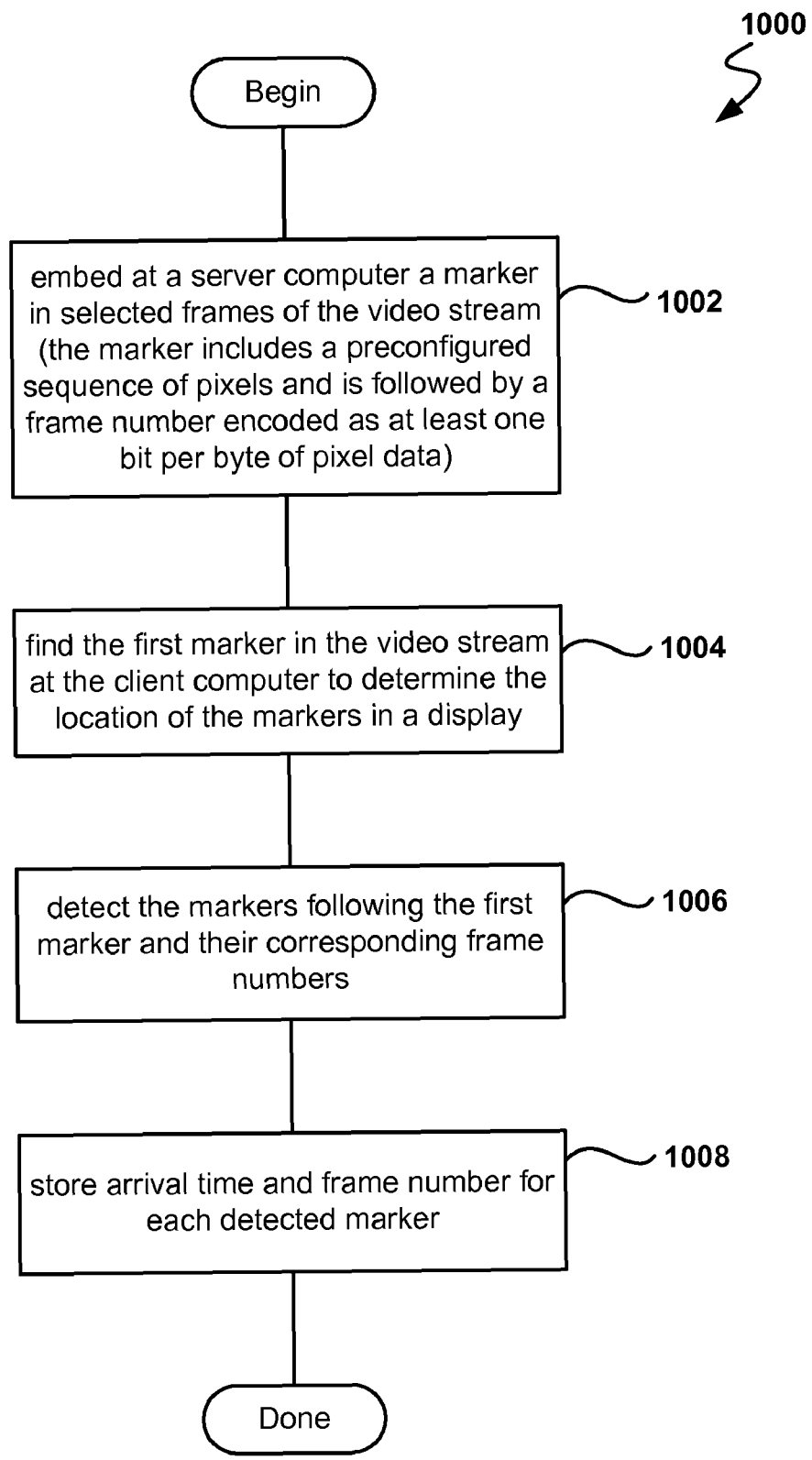
FIG. 10 shows the process flow for measuring performance of remote video delivery, in accordance with one embodiment.

FIG. 10 shows the process flow for measuring performance of remote video delivery, in accordance with one embodiment. In operation 1002, the method embeds at a server computer a marker in selected frames of a video stream. The marker includes a preconfigured sequence of pixels and is followed by a frame number encoded as at least one bit per byte of pixel data. See for example FIGS. 3A-3D for examples on how markers are embedded in video displays, and FIGS. 5-6 for examples on how information is encoded.

In operation 1004, the method finds a first marker at a client computer to determine a location of the markers in a display. See for example the pseudo code described with respect to FIG. 6 as one embodiment for detecting the first marker. The markers following the first marker are detected in operation 1006 with their corresponding frame numbers. In operation 1008, the method stores the arrival time and frame number for each detected marker.

Figure 11:
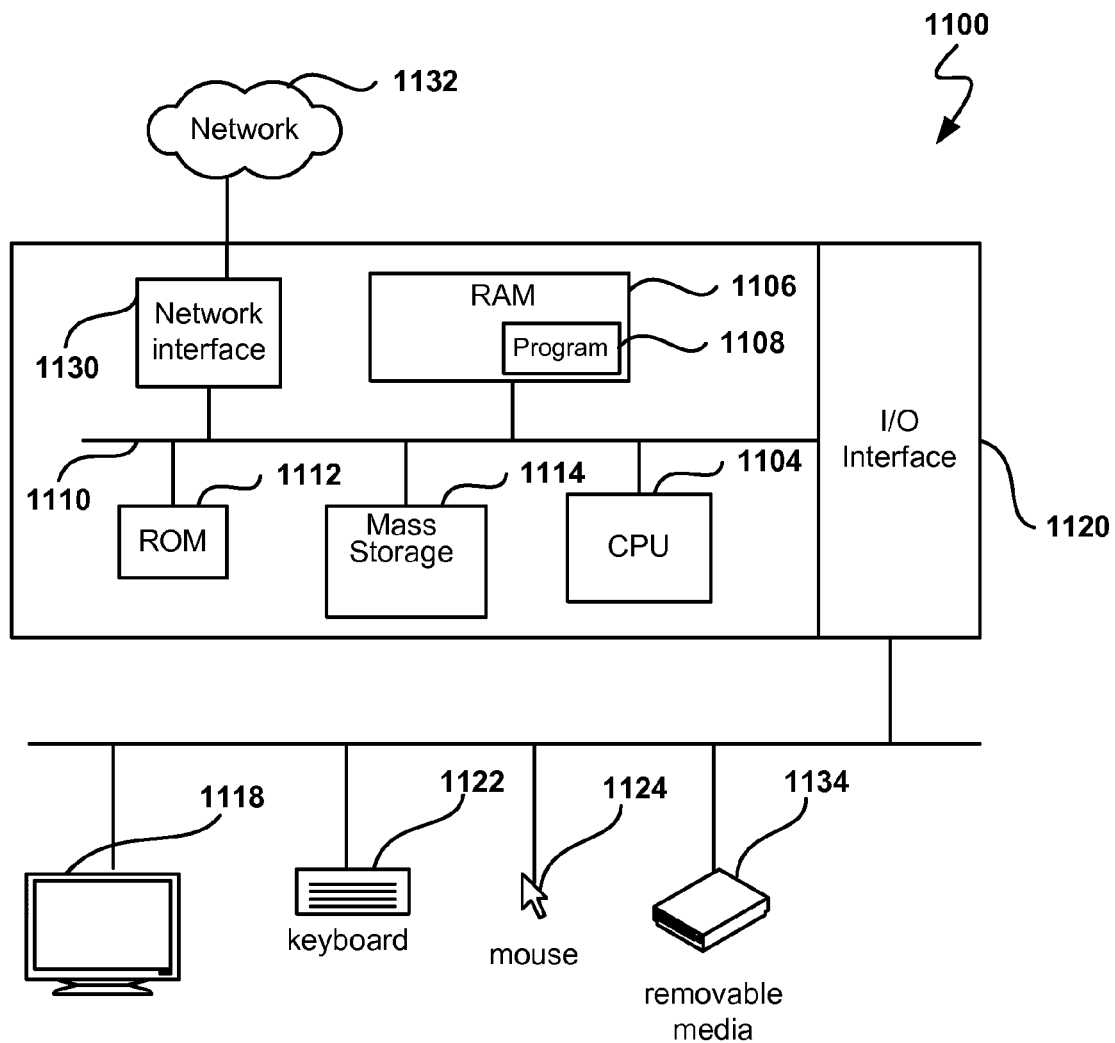
FIG. 11 is a simplified schematic diagram of a computer system for implementing embodiments of the present invention.

FIG. 11 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1104, which is coupled through bus 1110 to random access memory (RAM) 1106, read-only memory (ROM) 1112, and mass storage device 1114. Program 1108 resides in random access memory (RAM) 1106, but can also reside in mass storage 1114. Program 1108 can include any of the programs associated with the embodiments described herein, such as programs to deliver the functionality of video server 116, virtual server 114, web server 120, and performance server 122 of FIG. 1, as well as video tracker 206, video manager 216 and video transfer 220 of FIG. 2.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein, such as remote desktop view 202 from FIG.

2. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Although virtualization operations can take on many forms, several concepts are important to ensure that physical constructs of physical machines are properly transferred to virtual machines. With this in mind, and by way of reference, more information on virtual system and methods can be found in U.S. patents owned by the assignee of the present application, VMware, Inc. Thus, U.S. Pat. Nos. 6,397,242, 6,496,847, 7,069,413, 7,356,679, and US Published Application 2008/0244028 A1, are each incorporated by reference for all purposes.

For completeness, reference is made to an example server system, that is referred to by the trademark "ESX™", which is provided by VMware, of Palo Alto, Calif. However, the methods, systems and embodiments are not limited to any one brand of server or virtualization servers. The example ESX(x) server is a hypervisor that partitions physical servers in multiple virtual machines. Each virtual machine may represent a complete system, with processors, memory, networking, storage and BIOS. VMware ESX enables multiple virtual machines to: (a) share physical resources, (b) run unmodified operating systems and applications, and (c) run the most resource-intensive applications side by side on the same server. Other servers made by other suppliers can have similar functionality or more or less functionality, depending on their target product. Accordingly, the systems, methods and computer readable media can be practiced using any product, software, or hardware configuration.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method comprising:
   embedding at a server computer a block in a frame of a video stream, the block including a marker having a preconfigured sequence of pixels and a frame number encoded in pixel data of the frame, wherein the frame number indicates a position of the frame in a sequence of the frames of the video stream;
   transmitting the video stream to a client computer;
   searching for the preconfigured sequence of pixels in one or more frames of the transmitted video stream to determine a location of the marker in the frames;
   detecting markers in video frames and their corresponding frame numbers after the location is determined;
   storing an arrival time and the frame number for each detected marker; and
   calculating a performance metric for the transmitted video stream based on the stored arrival time and frame number for one or more of the detected markers.

2. The method as recited in claim 1, wherein the block further includes a random filler that is different from frame to frame.

3. The method as recited in claim 1, wherein the frame number is formed by combining a plurality of bits, each bit from the plurality of bits being encoded in one byte of pixel data.

4. The method as recited in claim 1, wherein the frame number is formed by combining a plurality of bits, each bit from the plurality of bits being encoded in a plurality of pixel data bytes.

5. The method as recited in claim 1, wherein the frame number is formed by combining a plurality of bits, each bit from the plurality of bits being encoded in a sub-pixel from the pixel data, the sub-pixel including intensity information for a color in a corresponding pixel.

6. The method as recited in claim 1, wherein the searching further includes:
   receiving display updates from the video stream; and
   assessing if a received display update includes the preconfigured sequence of pixels.

7. The method as recited in claim 6, wherein the searching further includes:
   searching the received display update to find the preconfigured sequence;
   determining if a plurality of pixels following a found preconfigured sequence form a valid frame number; and
   establishing that the frame number has been found when the preconfigured sequence has been found and the plurality of the pixels following the found preconfigured sequence form a valid frame number.

8. The method as recited in claim 7, wherein searching the received display update further includes:
allowing for a predetermined deviation from standard values in the preconfigured sequence.

9. The method as recited in claim 7, wherein determining if a plurality of pixels following a found preconfigured sequence form a valid frame number further includes:
assessing that a value of each byte from the plurality of pixels is valid when the value of each byte is within one of two valid value ranges; and
determining that a frame number is valid when the values of all the bytes from the plurality of pixels are assessed as valid.

10. The method as recited in claim 1, wherein detecting markers further includes:
receiving a display update from the video stream:
determining if the display update includes the location of the marker:
searching the preconfigured sequence of pixels in the display update when the display update includes the location of the marker; and
decoding the frame number from the pixels following the preconfigured sequence when the preconfigured sequence is found in the searching.

11. The method as recited in claim 10, wherein decoding the frame number further includes:
assigning a binary bit value to each byte from a plurality of pixels following the preconfigured sequence
joining the assigned binary bit values to form a binary word and
allocating the binary word to the frame number.

12. The method as recited in claim 11, wherein decoding the frame number further includes:
using threshold values when assigning binary bit values and
measuring a quality of the video stream based on a deviation of the bit values from the plurality of pixels following the preconfigured sequence from a standard bit value.

13. The method as recited in claim 10, wherein the display update includes display data for a rectangle within a frame of the video stream.

14. A system for measuring performance of remote video delivery, the system comprising:
a video server for delivering a video stream, the video server embedding a block in a frame of the video stream, the block including a marker having a preconfigured sequence of pixels and a frame number encoded in pixel data of the frame, wherein the frame number indicates a position of the frame in a sequence of the frames of the video stream;
a video client that receives the video stream, the video client configured to,
search for the preconfigured sequence of pixels to determine a location of the marker in the frame, and
detect markers in video frames and their corresponding frame numbers after the location is determined; and
a performance server configured to,
receive from the video client an arrival time and frame number for each detected marker,
store the received arrival times and frame numbers, and
calculate a performance metric for the received video stream based on the stored arrival times and frame numbers for one or more of the detected markers.

15. The system as recited in claim 14, wherein the block is placed in several locations in the video frame.

16. The system as recited in claim 14, wherein the video stream is displayed within a window in a display.

17. The system as recited in claim 14, wherein the video stream is displayed in full screen mode at a display.

18. The system as recited in claim 14, wherein the video client further includes:
a mirror buffer linked to a frame buffer that receives updates from the server, wherein the video client detect markers by monitoring the minor buffer.

19. A computer program embedded in a non-transitory computer-readable storage medium, when executed by one or more processors, for measuring performance of remote video delivery, the computer program comprising:
program instructions for embedding at a server computer a block in a frame of a video stream, the block including a marker having a preconfigured sequence of pixels and a frame number encoded in pixel data of the frame, wherein the frame number indicates a position of the frame in a sequence of the frames of the video stream;
program instructions for transmitting the video stream to a client computer;
program instructions for searching for the preconfigured sequence of pixels in one or more frames of the transmitted video stream to determine a location of the marker in the frames;
program instructions for detecting markers in video frames and their corresponding frame numbers after the location is determined;
program instructions for storing an arrival time and the frame number for each detected marker and
program instructions for calculating a performance metric for the transmitted video stream based on the stored arrival time and frame number for one or more of the detected markers.

20. The computer program as recited in claim 19, wherein a block is embedded in each frame of the video stream.

21. The computer program as recited in claim 19, wherein a block is embedded periodically in frames of the video stream, a period for embedding blocks being adjustable.

22. The computer program as recited in claim 19, wherein the marker is masked before being displayed at the client computer with a preconfigured value.

23. The computer program as recited in claim 19, wherein the block is masked before being displayed at the client computer with a value corresponding to a most recent frame without a block.

24. A computer implemented method comprising:
embedding a block in a frame of a video stream, the block including a marker and a frame number encoded in pixel data of the frame, wherein the frame number indicates a position of the frame in a sequence of the frames of the video stream, wherein the marker indicates a location of the frame number within the frame of the video stream;
transmitting the video stream to a client computer;
receiving from the client computer one or more arrival times of frames of the video stream; and
calculating a performance metric for the transmitted video stream based on one or more of the received one or more arrival times of the frames.

25. The method as recited in claim 24, wherein the block further includes a random filler that is different from frame to frame.

26. The method as recited in claim 24, wherein the frame number is formed by combining a plurality of bits, each bit from the plurality of bits being encoded in one byte of pixel data.

27. The method as recited in claim 24, wherein the frame number is formed by combining a plurality of bits, each bit from the plurality of bits being encoded in a plurality of pixel data bytes.

28. The method as recited in claim 24, wherein the frame number is formed by combining a plurality of bits, each bit from the plurality of bits being encoded in a sub-pixel from the pixel data, the sub-pixel including intensity information for a color in a corresponding pixel.

29. The method as recited in claim 24, further including:
sending display updates, wherein each display update includes display data for a rectangle within a frame of the video stream.

30. A computer implemented method comprising:
receiving a video stream from a server computer, wherein the video stream includes a sequence of frames, wherein at least one frame includes an embedded block, the block including a marker having a preconfigured sequence of pixels and a frame number encoded in pixel data of the frame, wherein the frame number indicates a position of the frame in the sequence of frames;
searching for the preconfigured sequence of pixels in one or more frames of the received video stream to determine a location of the marker in the frames;
detecting markers in video frames and their corresponding frame numbers after the location is determined;
storing an arrival time and the frame number for each detected marker; and
calculating a performance metric for the received video stream based on the stored arrival time and the frame number for one or more of the detected markers.

31. The method as recited in claim 30, wherein the searching further includes:
receiving display updates from the video stream; and
assessing if a received display update includes the preconfigured sequence of pixels.

32. The method as recited in claim 31, wherein the searching further includes:
searching the received display updates to find the preconfigured sequence;
determining if a plurality of pixels following a found preconfigured sequence form a valid frame number; and
establishing that the frame number has been found when the preconfigured sequence has been found and the plurality of the pixels following the found preconfigured sequence form a valid frame number.

33. The method as recited in claim 32, wherein searching the received display updates further includes:
allowing for a predetermined deviation from standard values in the preconfigured sequence.

34. The method as recited in claim 32, wherein determining if a plurality of pixels following a found preconfigured sequence form a valid frame number further includes:
assessing that a value of each byte from the plurality of pixels is valid when the value of each byte is within one of two valid value ranges; and
determining that a frame number is valid when the values of all the bytes from the plurality of pixels are assessed as valid.

35. The method as recited in claim 30, wherein detecting markers further includes:
receiving a display update from the video stream;
determining if the display update includes the location of the marker;
searching the preconfigured sequence of pixels in the display update when the display update includes the location of the marker; and
decoding the frame number from the pixels following the preconfigured sequence when the preconfigured sequence is found in the searching.

36. The method as recited in claim 35, wherein decoding the frame number further includes:
assigning a binary bit value to each byte from a plurality of pixels following the preconfigured sequence;
joining the assigned binary bit values to form a binary word; and
allocating the binary word to the frame number.

37. The method as recited in claim 36, wherein decoding the frame number further includes:
using threshold values when assigning binary bit values; and
measuring a quality of the video stream based on a deviation of the bit values from the plurality of pixels following the preconfigured sequence from a standard bit value.

* * * * *